United States Patent [19]
Hahn et al.
[11] 4,213,760
[45] Jul. 22, 1980

[54] DELIMING OF HIDES

[75] Inventors: Erwin Hahn, Heidelberg; Bernhard Magerkurth, Ludwigshafen; Dietrich Lach, Friedelsheim; Lothar Wuertele, Ludwigshafen, all of Fed. Rep. of Germany

[73] Assignee: BASF Aktiengesellschaft, Fed. Rep. of Germany

[21] Appl. No.: 38,252

[22] Filed: May 11, 1979

[30] Foreign Application Priority Data

Jun. 8, 1978 [DE] Fed. Rep. of Germany ....... 2825081

[51] Int. Cl.[2] ........................... C08C 1/00; C08C 1/08
[52] U.S. Cl. ........................................ 8/94.17; 8/94.18
[58] Field of Search .............................. 8/94.17, 94.18

[56] References Cited

U.S. PATENT DOCUMENTS

| | | | |
|---|---|---|---|
| 2,266,448 | 12/1941 | Trosken et al. | 8/94.17 |
| 2,318,454 | 5/1943 | Bentsch et al. | 8/94.17 |
| 2,556,649 | 6/1951 | Heinemann | 8/94.17 |
| 2,639,967 | 5/1953 | Rudy | 8/94.17 |

OTHER PUBLICATIONS

SN 402440, published 6-1-43; Alien Property Custodian; Coutor.

*Primary Examiner*—William F. Hamrock
*Attorney, Agent, or Firm*—Keil & Witherspoon

[57] ABSTRACT

A process for deliming hides, in which, instead of using conventional acids or acid salts, esters which hydrolyze under the conventional deliming conditions are employed. This avoids the disadvantages associated with an overdose of conventional deliming agents.

3 Claims, No Drawings

DELIMING OF HIDES

The present invention relates to a process for deliming hides.

The liming of hides for the purpose of unhairing them and opening them up, in the course of the manufacture of leather, is carried out in an alkaline medium, in most cases using an inorganic, or organic, sulfide. The alkaline agent employed is normally lime, as a rule by itself but occasionally mixed with sodium hydroxide. Subsequently, the hide must be freed from the liming chemicals, especially from lime, in order to prepare it for further processing, i.e. it must be delimed. This deliming has hitherto been carried out with an acid or acid salt, e.g. phthalic acid, sulfophthalic acid, formic acid, acetic acid, boric acid, mixtures of aliphatic dicarboxylic acids, hydrochloric acid, sulfuric acid and the ammonium salts of the said acids. The conventional conditions are;

length of liquor: from 0 to 300%, preferably from 0 to 200%, based on the hide weight:

temperature: from 5° to 35° C., preferably from 25° to 35° C.;

final pH of the liquor: 6–8.7;

deliming time: from 1 to 6, preferably from 1 to 3, hours.

A serious disadvantage of all conventional deliming processes is attributable to the following circumstances: the amount of chemicals required for deliming depends greatly on the content of lime, and, where relevant, other basic compounds, for example sodium sulfide and sodium hydroxide, in the hide. Since this content always fluctuates, precise metering of the deliming chemicals is hardly possible in industrial practice. Hence, it can easily happen that an overdose is used. The consequence of this is that the pH drops to the isoelectric point of the protein (pH about 5). This causes the precipitation of protein substances which have dissolved during liming, with or without the precipitation of other dissolved soiling matter. The precipitate deposits on the surface of the hide in a form which is difficult to remove, makes the hide unsightly and interferes with subsequent processing, especially with dyeing. It also adversely affects the hand of the leather. Hitherto, attempts have been made to solve this problem by using ammonium salts as safe deliming agents. Since, however, the pH of aqueous ammonium salt solutions can be less than 5, these reagents also do not offer the desired safety. Furthermore, the use of ammonium salts also presents ecological problems. Ammonium salts are only incompletely degraded in sewage installations and accordingly increase the COD value of the effluent.

The present invention seeks to provide a deliming process which avoids these disadvantages, i.e. which is insensitive to an overdose of the deliming chemicals, does not allow the pH of the deliming liquor to drop below 5, and does not employ ammonium salts.

We have found, surprisingly, that if, instead of a conventional acid or acid salt, an ester which hydrolyzes under the deliming conditions is added as deliming agent good results are obtained and the disadvantages associated with an overdose of conventional deliming agents may be avoided.

According to the invention there is provided a process for deliming conventionally limed hides, wherein these hides are treated for from 1 to 6 hours at from 5° to 35° C., using a length of liquor of from 0 to 300%, with from 0.8 to 4%, based on the weight of the wet hides, of an ester of equivalent weight less than 300, which, in 10 percent strength by weight aqueous solution or emulsion at 25° C. and pH 9, hydrolyzes to the extent of a least 90% in the course of two hours.

The process according to the invention may be carried out in an otherwise conventional manner and requires no additional measures whatsoever, nor does it entail any disadvantages relative to the conventional processes. It is true that the principle of the invention appears plausible in retrospect, but it was in no way foreseeable that it would work. The principle is that the ester employed is hydrolyzed by the very alkaline reagents which are to be neutralized and removed, and at the same time the corresponding salt of the acid is produced, but this salt causes little or no hydrolysis of the excess ester. Accordingly, if an excess of ester is used, it automatically ensures that on the one hand all the lime and, where relevant, all the alkali is neutralized, whilst on the other hand, because of the buffering action of the salts produced, the pH never drops as far as the critical range of about 5. In this way, the disadvantages of the prior art, described above, are avoided reliably. The metering out of the deliming agent is no longer critical and even at a high overdose precipitation can no longer occur. Because of the high reliability of the process, clean and pale pelts are always obtained, which in turn give very soft leathers which have a fine and smooth grain and can, without problems, be dyed evenly.

Suitable esters for use in accordance with the invention are those which in 10% strength aqueous solution or emulsion at 25° C. and pH 9 hydrolyze to the extent of at least 90% in the course of two hours, preferably in the course of 45 minutes. In order to minimize the amount employed, esters having an equivalent weight of less than 300, preferably less than 250 and especially less than 150, are preferred. Accordingly, examples of suitable esters are the esters of lower aliphatic carboxylic acids, particularly alkanoic acids such as formic acid, acetic acid, propionic acid and butyric acid with lower alcohols, particularly alkanols such as methanol, ethanol, n-propanol, i-propanol, n-butanol, sec.-butanol and i-butanol, the esters of lactic acid with the said alcohols, dimethyl malonate and dimethyl maleate. Water-soluble esters, especially methyl lactate, methyl formate, ethylene glycol monoformate and diformate and mixtures of these, very especially mixtures of the three last-mentioned esters, are preferred.

The amounts employed depend on the content of lime and other basic compounds (for example sodium sulfide and sodium hydroxide) in the hide, but are of the order of magnitude of from 0.8 to 4%, preferably from 1 to 2% by weight, based on the weight of the wet hides.

Insufficiently water-soluble esters can be emulsified in the conventional manner with conventional cationic, anionic or nonionic emulsifiers, and this in no way presents a problem.

Parts and percentages in the Examples and Comparative Experiment which follow are by weight.

EXAMPLE 1

100 parts of 4.5 mm thick cattle hide which has been soaked and limed in the conventional manner are drummed at 30° C., in 50% liquor, with 1.6%, based on the pelt weight, of a mixture of ethylene glycol monoformate and ethylene glycol diformate (weight ratio 1:1). After 30 minutes, the pH of the liquor is 6.2 and the pelt has been 70% delimed. After a further 90 minutes, a cross-section of the pelt no longer gives a red color with phenolphthalein; the pH of the liquor is at that stage 6.4. The liquor is then lengthened to 200%, drumming is continued for 60 minutes, the liquor is then drained off and the pelts are finally washed with 200% of water for 20 minutes.

The pelts are very clean and pale.

Thereafter, using the conventional methods, the pelts are pickled with sulfuric acid, tanned with a commercial basic chromium sulfate and finally dyed and fat-liquored.

A very soft, evenly dyed leather with a very fine grain is obtained.

EXAMPLE 2

The procedure described in Example 1 is followed, but twice the amount of the deliming agent is employed so as to test its effect at an overdose. In this experiment, again, the pH of the liquor only drops to 6.2. The results in respect of cleanness of the pelts and quality of the leather correspond to those of Example 1.

COMPARATIVE EXPERIMENT

The procedure described in Example 1 is followed, except that 2.2% of a commercial deliming agent based on ammonium sulfophthalate are employed. After 30 minutes, the pH of the liquor is 4.1. After a further 90 minutes, the pH has risen to 8.4 which indicates that in spite of the low pH at the start of deliming an overdose had not been used. The delimed pelts are not as clean and bright as those of Examples 1 and 2. The leather obtained after finishing as described in Example 1 is somewhat less evenly dyed, and harder, than the leather from Examples 1 and 2. Furthermore, the grain is rougher.

In the Examples shown below, the procedure described in Example 1 is followed. The results correspond to those of the said Example. Details are shown in the Table. The surfactant employed was a commercial anionic wetting agent.

| Ex. | Deliming agent | Amount employed: Deliming agent | Amount employed: Surfactant | Deliming time |
|---|---|---|---|---|
| 3 | Isobutyl formate | 2% | 0.25% | 6 hours |
| 4 | Methyl formate | 1.5% | — | 2 hours |
| 5 | Dimethyl maleate | 1.6% | 0.25% | 5 hours |
| 6 | Methyl lactate | 2.2% | — | 2 hours |
| 7 | Methylglycol acetate | 2.2% | 0.25% | 4 hours |

We claim:

1. A process for deliming conventionally limed hides, wherein these hides are treated for from 1 to 6 hours at from 5° to 35° C., using a length of liquor of from 0 to 300%, with from 0.8 to 4%, based on the weight of the wet hides, of an ester of equivalent weight less than 300, which, in 10 percent strength by weight aqueous solution or emulsion at 25° C. and pH 9, hydrolyzes to the extent of at least 90% in the course of two hours.

2. A process as claimed in claim 1, wherein a water-soluble ester is employed as the effective agent.

3. A process as claimed in claim 2, wherein one of the following esters is employed as the effective agent: methyl lactate, ethylene glycol monoformate or diformate or a mixture of these with one another and/or with methyl formate.

* * * * *